United States Patent [19]

Kashiwagi et al.

[11] Patent Number: 5,377,016

[45] Date of Patent: Dec. 27, 1994

[54] MULTI-FUNCTION IMAGE PROCESSING SYSTEM

[75] Inventors: Hideaki Kashiwagi; Daiji Nagaoka; Nobuyuki Matsuki; Ken Hasegawa, all of Kanagawa, Japan

[73] Assignee: Fuji Xerox Co., Ltd., Tokyo, Japan

[21] Appl. No.: 43,971

[22] Filed: Apr. 7, 1993

Related U.S. Application Data

[63] Continuation of Ser. No. 595,858, Oct. 10, 1990, abandoned.

[51] Int. Cl.5 ............... H04N 1/00; H04N 1/40; H04N 1/32
[52] U.S. Cl. .................... 358/403; 358/448; 358/468
[58] Field of Search .......... 358/400, 401, 403, 443, 358/448, 468, 434, 437, 442; 355/313, 314

[56] References Cited

U.S. PATENT DOCUMENTS

| | | | |
|---|---|---|---|
| 4,213,694 | 7/1980 | Kuseski | 355/323 |
| 4,680,641 | 7/1987 | Nakazawa | 358/401 |
| 4,947,345 | 8/1990 | Paradise et al. | 358/442 |
| 5,130,806 | 7/1992 | Reed et al. | 358/468 |
| 5,148,286 | 9/1992 | Knodt et al. | 358/468 |
| 5,245,368 | 9/1993 | Farrell et al. | 358/468 |

Primary Examiner—Edward L. Coles, Sr.
Assistant Examiner—Thomas D. Lee
Attorney, Agent, or Firm—Finnegan, Henderson, Farabow, Garrett & Dunner

[57] ABSTRACT

A control circuit receives in advance data representing a predetermined number of copy jobs to be provided from a scanner and data representing a predetermined number of print jobs to be provided from external equipment, queues each of the copy jobs and print jobs on the basis of such data, and causes the jobs to be processed in a time divisional and parallel manner. Basically, the control circuit gives higher priority to the copy job. The priority order can be changed according to an instruction from a user interface. When a current job has been suspended, the control circuit causes a succeeding job to be processed earlier.

7 Claims, 4 Drawing Sheets

MULTI-FUNCTION IMAGE PROCESSING SYSTEM

This application is a continuation of application Ser. No. 07/595,858 filed Oct. 10, 1990 now abandoned.

BACKGROUND OF THE INVENTION

1. Field of the Invention

This invention relates to a multi-function image processing system in which image data provided by an image reading unit and image data provided by external equipment are processed in a parallel mode.

2. Discussion of the Related Art

Figure 5:
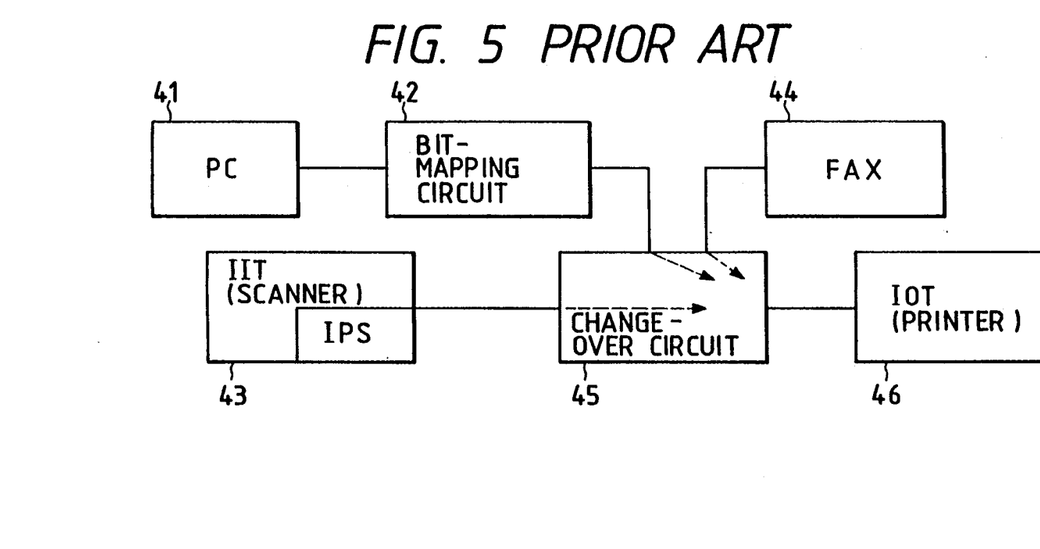
FIG. 5 is a block diagram showing one example of a conventional digital image processing system.

FIG. 5 shows one example of a conventional digital image processing system.

In the digital copying machine, an IIT (image input terminal) 43 reads an original with a CCD sensor or the like, and converts analog values of the resultant video signal into digital values. The digital signal is converted into binary data, being processed (for instance corrected and edited), by an IPS (image processing system). And an IOT (image output terminal) controls the on/off state of pixels according to the binary data to output a mesh-point image, thereby to reproduce the original's image.

External equipment, such as a PC (personal computer) and a facsimile machine, may be connected to the above-described digital copying machine to share the IOT 46. In this case, as shown in FIG. 5, the IOT 46 is separated from the IIT 43, and a change-over unit 45 is provided therebetween so that the IOT 46 is connected through the change-over unit 45 to the IIT 43, the PC 41 or the facsimile machine 44. Thus, the binary data provided by the PC 41 or the facsimile machine 44 can also be output similarly as in the case of the binary data provided by the IIT 43. In general the PC 41 handles code data, and therefore the PC 41 applies the binary data obtained by bit-mapping the code data to the IOT 46. The facsimile machine 44 supplies the decoded binary data to the IOT 46.

There have been available, as described above, digital image processing systems in which a printer is shared by a digital copying machine, PC, facsimile machine, etc. However, these conventional systems are not so high in productivity, because the elements thereof operate individually and exclusively.

In the conventional system comprising the digital copying machine, the PC and the facsimile machine, etc., the copying function and the print job from the external equipment are not performed in a parallel mode; that is, the jobs are processed in a first-come first-served basis. Therefore, the conventional systems suffer from a difficulty that the copying function cannot be used while a large amount of print jobs from the external equipment are being performed.

SUMMARY OF THE INVENTION

The present invention has been made in view of the above circumstances and has an object of providing a multifunction image processing system in which job advance control and job priority control are carried out to reduce the user's waiting time and to improve productivity.

Another object of the invention is to provide a multi-function image processing system in which when one job is suspended, another succeeding job is performed passing the suspended one.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, the multi-function image processing system comprises: means for compressing image data, means for storing output data of the compressing means, means for expanding the compressed image data into the original image data, and means for controlling each of the above means, in which image data provided by an image input unit is compressed and stored, and the image data thus stored is read out, expanded and transmitted to an image output unit, and in which, according to the invention, the control means receives in advance data representing a predetermined number of jobs to be provided by an image reading unit in the image input unit or by external equipment, queues the jobs, and allows the jobs to be parallel-processed in a time division mode, and further the control means is constructed so as to be able to change the order of preference of two jobs being processed simultaneously.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A multi-function image processing system according to an embodiment of this invention will be described with reference to FIG. 1.

Figure 1:
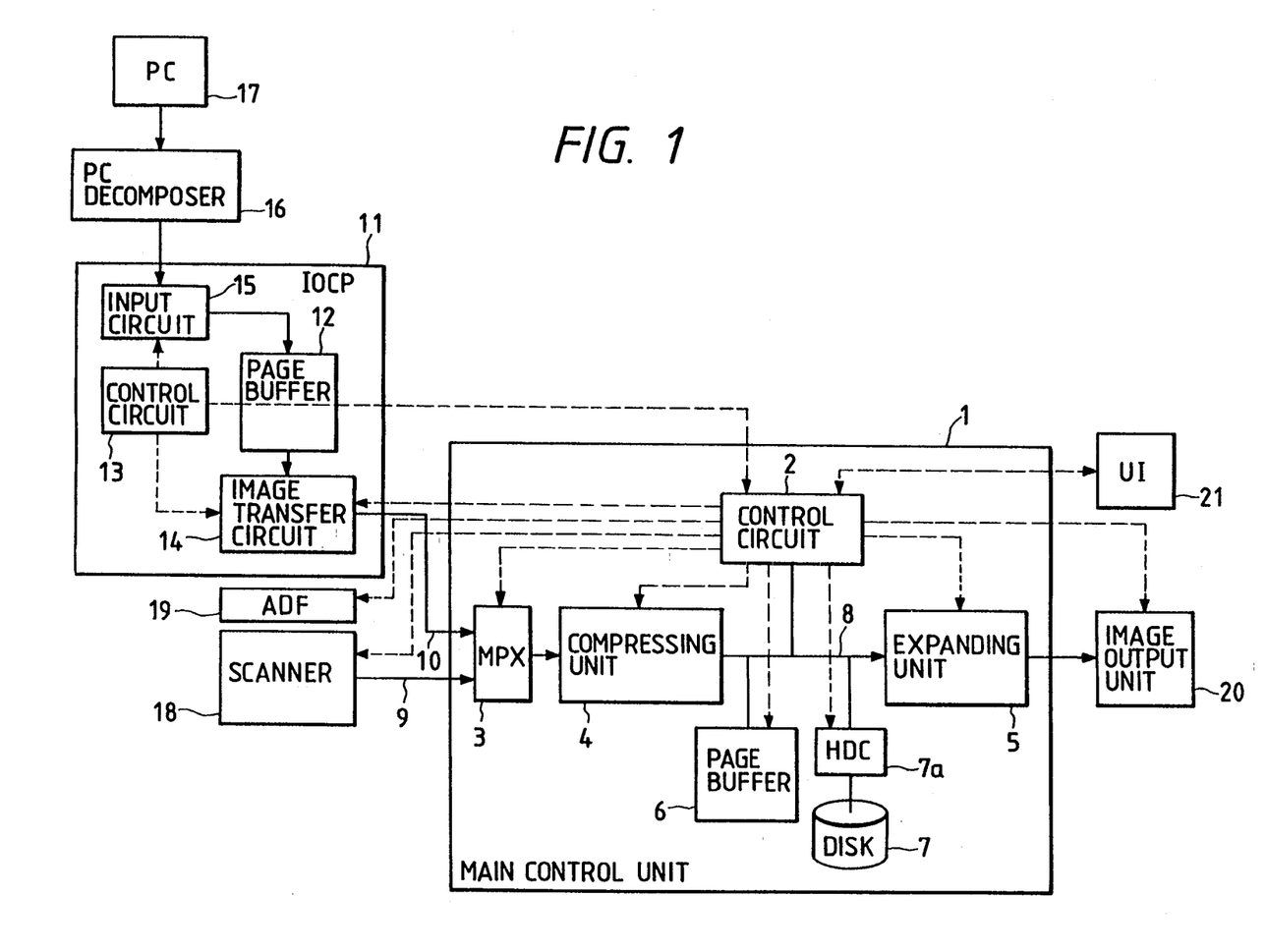
FIG. 1 is a block diagram showing the arrangement of a multi-function image processing system according to an embodiment of this invention.

As shown in FIG. 1, a main control unit 1 comprises: a multiplexer for switching between the image data of a scanner 18 and the image data of external equipment such as a PC and facsimile machine; a compressing unit 4 for compressing the image data; an expanding unit 5 for restoring the compressed data into the original image data; a page buffer 6, a large amount of data storing memory, namely, a disk 7, and a control circuit 2.

A scanner 18 is an image reading unit for reading an original with a CCD sensor or the like. The scanner 18 gives offset adjustment and gain adjustment to the signal thus read, converts analog image data into digital image data, and performs gap correction and shading correction, etc. for the latter. In the case of reading a colored original, the scanner 18 obtains color-separated image data of the primary colors, red (R), blue (B) and green (G). The image data thus obtained are subjected to END (equivalent neutral density conversion), color masking, original Size detection, color conversion, UCR (under color removal), black generation, mesh point removal and edge emphasis, TRC (tone reproduction control), compression/expansion, editing, etc. The scanner 18 is provided with an ADF 19 for automatically feeding an original to be read.

Further in FIG. 1, reference numeral 20 designates an image output unit which is, for instance, a laser printer. The device 20 controls the on/off operation of the laser beam for each pixel according to the binary data obtained from the image data, and can provide an halftone image by mesh points.

In FIG. 1, a PC 17 is an ordinary personal computer, and a PC decomposer 16 develops the code data handled by the PC 17 into a bit map. An IOCP 11 is an external equipment control unit which comprises a PC image data input circuit 15, a page buffer 12, an image transfer circuit 14, and a control circuit 13. In the IOCP 11, the image data in the page buffer 12 are transferred after being divided properly.

An UI 21 is made up of a display unit, a control panel, etc. for setting/inputting various functions and editing operations, and displaying the contents thereof.

The above-described components of the main control unit 1 operate as follows:

The multiplexer 3 chooses a bus on the input side to be connected to an image bus 8 between a scanner image bus 9 and an IOCP image bus 10.

The compressing unit 4 has two modes, a compression mode and a through mode. In the compression mode, the compressing unit 4 compresses data, for instance, according to an adaptive prediction coding system. In the adaptive prediction coding system, image data is predicted with a plurality of predictors for every eight pixels for instance, and the predictor highest in the percentage of hit is used for prediction of the next eight pixels. In this case, the image signal for which the prediction has come true is represented by "0", and the image signal for which the prediction has not come true is represented by "1".

The expanding unit 5 has an expansion mode and a through mode. In the expansion mode, the compressed image data is restored to the original image data.

The page buffer 6 is to store the image data of several pages of an original. More specifically, the page buffer temporarily stores data to be written in the disk 7 or data read out of the disk 7, or temporarily stores image data to be reproduced without using the disk 7, so that, with the aid of the control circuit 2, the image data is edited, for instance rewritten or replaced, before the reproduction.

The disk 7 is a data storing memory large in capacity to store a large amount of image data compressed. Reading data from or writing data in the disk 7 is controlled by a disk controller (HDC) 7a.

What are stored in the disk 7 are binary or multivalued image data not and code data. The code data, being bit-mapped by the PC decomposer 16, is input through the IOCP image bus 10, the multiplexer 3 and the compressing unit 4. In this case, the compressing unit 4 is in the through mode. The through mode is also employed in the case where the image data is output as it is, not being processed by the compressing unit 4 and the expanding unit 5.

Now, an operation of outputting the image read by the scanner 18 will be described.

In the case where an image outputting operation is carried out only for a single copy with an original read by the scanner 18, the compressing unit 4 and the expanding unit 5 are both placed in the through mode. The image data obtained by reading the original with the scanner 18 is applied, as it is (without being compressed nor expanded), to the image output unit 20 through the scanner image bus 9, the compressing unit 4 and the expanding unit 5. In this case, the following method may be employed: The compressing unit 4 is placed in the compression mode and the expanding unit 5 is placed in the expansion mode, so that the data is compressed and the data thus compressed is applied to the expanding unit 5 directly or after being stored in the disk 7.

In an image outputting operation for a plurality of copies, the compressing unit 4 is placed in the compression mode and the expanding unit 5 is placed in the expansion mode. The image data provided by reading an original with the scanner 18 are compressed by the compressing unit 4 and stored in the disk 7. Thereafter, the image data are read, in the order of pages, out of the disk 7 as many times as the specified number of copies. The image data thus read, are applied after being expanded by the expanding unit 4, to the image output unit 20. Hence, one image reading operation by the scanner 18 results in the output of a plurality of images. For the first copy, the data may be expanded by the expanding unit 5 simultaneously when stored in the disk 7. This method is advantageous in that the image for the first copy can be output earlier, and the time required for the outputting of images can be reduced as much.

In the case where an image outputting operation is carried out with an origin read, the operation of the scanner 18 consists of a pre-scan operation and a main-scan operation, each of which includes a scan return operation in which, after reading an original, a scanning member returns to the scan start position. Also, it should be noted that the image data is output to the scanner image bus 9 only when the original is read in the main-scan operation. In the pre-scan operation, detection of the size of the original, detection of the editing marks, and reading of the area are carried out only within the scanner 18. Hence, the scanner image bus 9 is not used during the pre-scan operation and the scan return operation.

In order to process the PC data in a parallel mode during the operation of the scanner 18, the input side bus connection should be switched from the scanner image bus 9 to the IOCP image bus 10 by the multiplexer 3 during a time other than the period of time during which the original is read in the main-scan operation, i.e., during the pre-scan operation and the scan return operation, or during the pause period of the scanner 18. For instance in the above-described image output operation for a plurality of copies, the scanner 18 is stopped after reading the original. Even during this pause period, an operation of reading data from the disk 7 and an image outputting process are carried out for a "copy job". Therefore, the image bus 8 is used during the execution of such operations.

Hence, while the scanner 18 reads the original in the main-scan operation, or while a copy job for a plurality of copies is performed, even if data is output by the PC 17, it is temporarily stored in the page buffer 12 of the IOCP 11 until transfer is permitted. It is later transferred when the bus 8 is not used.

In general, as an image is improved in picture quality, the amount of image data is increased. Therefore, the time of scan return is not long enough to transfer the image data of one page from the page buffer 12 in the IOCP 11. Hence, if the PC data is processed with the top priority given to the process for the scanner image, it may be the case that the process for the PC data is carried out after that for the scanner image. However, this method is disadvantageous in the case where the number of scanner images is large. That is, before actually processed, PC data are successively input to the page buffer 12, which results in overflow of the page buffer 12.

If an interrupt is caused every scan, the PC data may be processed between the scans. However, in this case, the conventional continuous scan cannot be carried out, and it is necessary to perform time adjustment for processing the PC data between the scans; that is, it is necessary to give a scan latency time adjusting function to the scanner 18.

This difficulty can be overcome by the method in which the PC data is divided so that each divisional data can be transferred during the time of scan return. In this case, the PC data can be transferred during the scan return with the conventional scanner operation maintained unchanged.

Figure 2:
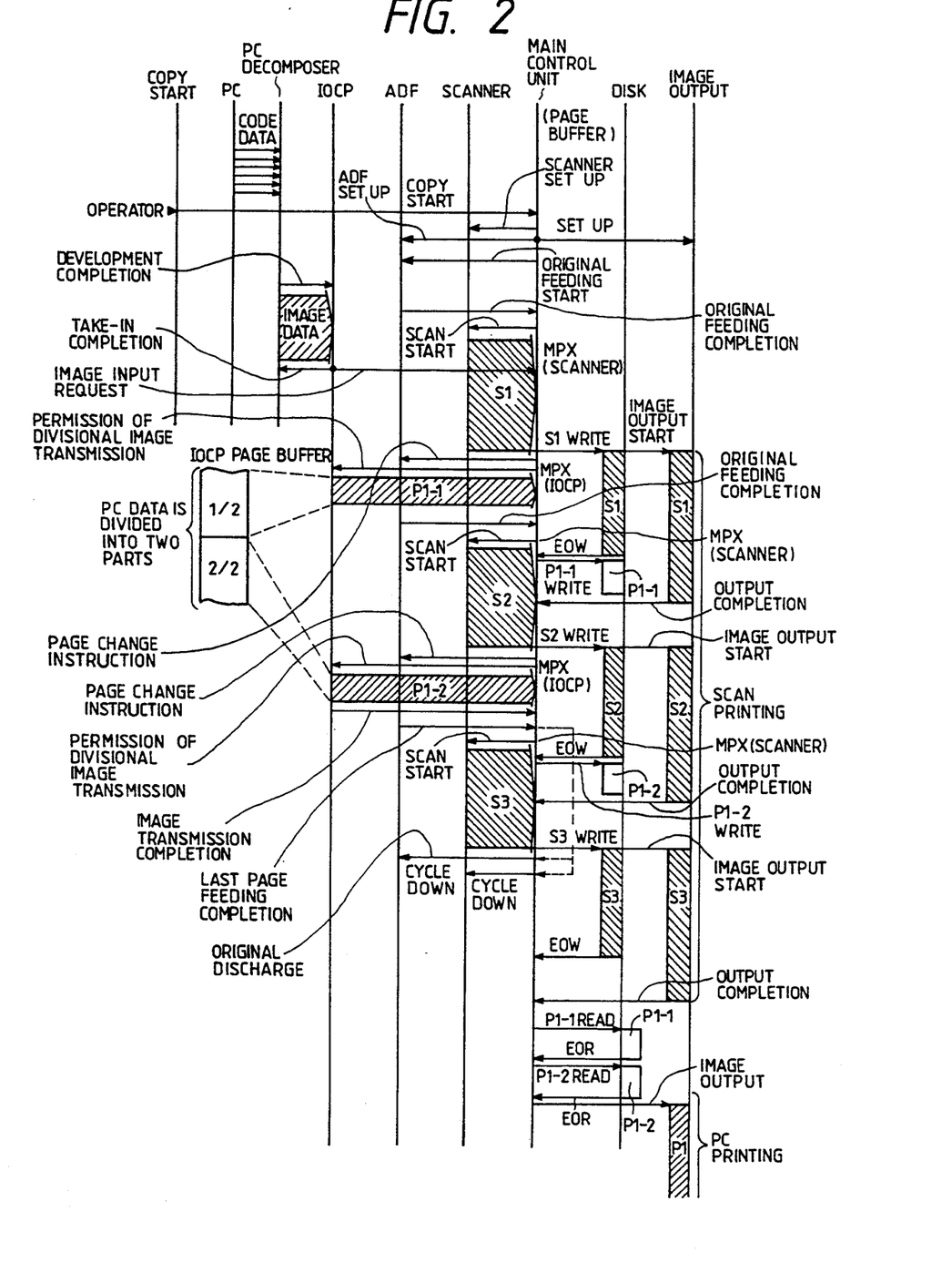
FIG. 2 is a diagram showing in detail one example of a sequence flow employed in the invention.

FIG. 2 is a diagram showing in detail a sequence flow for processing the PC data in this method.

In the sequence flow, a PC data transfer unit is obtained by dividing the PC data of one page into two parts, and the multiplexer 3 operates every scan return to change the bus, so that the PC data of one page can be processed with a plurality of scan returns.

Upon reception of code data from the PC 17, the PC decomposer 16 develops the code data into a bit map. Upon completion of the developing of the code data, the PC decomposer 16 informs the IOCP 11 of the completion of the developing, and transfers the developed image data. The IOCP 11 transmits a reception completion signal to the PC decomposer 16 and simultaneously applies an image input request signal to the main control unit 1.

On the other hand, upon reception of a copy start signal input by the operator, the main control unit 1 applies a setup instruction to the scanner 18, the ADF 19, and the image output unit 10, and causes the ADF 19 to start its operation of feeding an original. In response to an original feeding completion signal from the ADF 19, the main control unit 1 causes the scanner 18 to start its operation, and causes the page buffer 6 to take in scan image data S1 from the scanner 18. Immediately after the scan image data. S1 has been taken in by the page buffer 6, the main control unit 1 operates to write the data in the disk 7 and starts outputting the image data to the image output unit 20, and issues an original replacing instruction to the ADF 19.

In the case where an image input request has been made by the IOCP 11 by this time instant, the main control unit 1 causes the multiplexer 3 to choose the IOC image bus 10 to provide an image division transmission permission to the IOCP 11, so that the PC printing image data Pl-1, which corresponds to a half page, is loaded into the page buffer 6 of the main control unit 1 from the page buffer 12 of the IOCP 11. The image data division to two parts has been selected because the half page data can be transmitted during the period which elapses from the time instant that the main control unit 1 provides the original replacing instruction to the ADF 19 until the ADF 19 returns the original feeding completion signal to the main control unit 1.

Receiving the original feeding completion signal from the ADF 19 after the taking-in of the PC printing image data Pl-1, the main control unit 1 operates to cause the multiplexer 3 to choose the scanner image bus 9 and to cause the scanner 18 to start the scan, thereby to take scan image data S2 in the page buffer 6 similarly as in the above. During this period, the PC printing image data Pl-1 of a half page is written in the disk 7 after the scan image data S1.

When the scan image data S3 is stored in the page buffer 6 after the ADF 19 has returned a last page feeding completion signal to the main control unit 1, the scanner 18 and the ADF 19 are reset for cycle down. Thereafter, when the operation of writing the data S3 in the disk 7 and the operation of outputting the data to the image output unit 20 have been accomplished, the main control unit 1 operates to transfer the PC printing image data Pl-1 and Pl-2 from the disk 7 to the page buffer 6, and performs the outputting of those image data to the image output unit 20.

Figure 3:
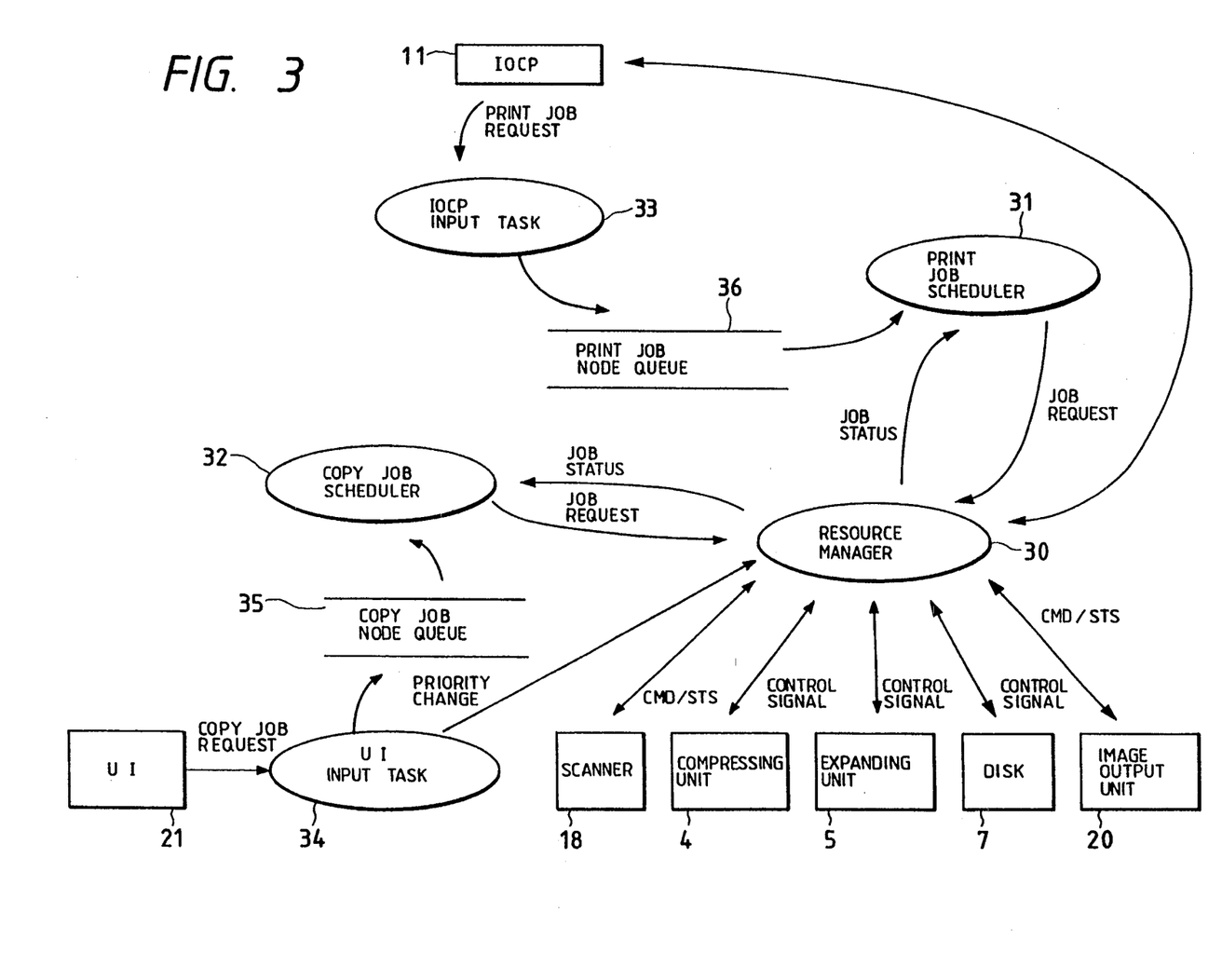
FIG. 3 is a diagram for a description of a job control by a control circuit.
Figure 4:
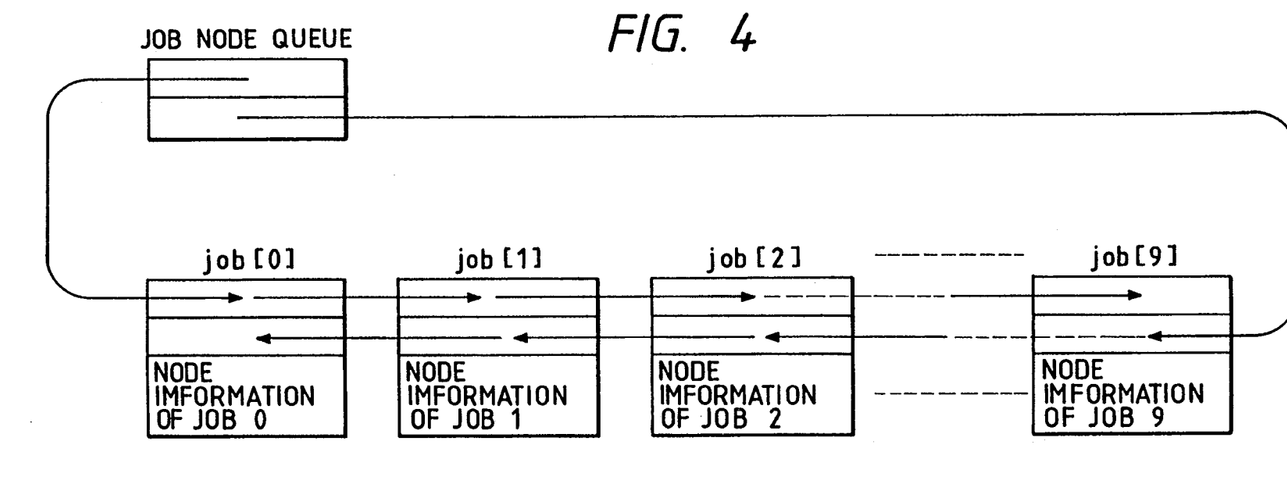
FIG. 4 is an explanatory diagram showing the arrangement of a job node queue.

Now, the job control will be described with reference to FIGS. 3 and 4. FIG. 3 is a diagram for a description of the job control by the control circuit 2, and FIG. 4 is a diagram showing one example of a job node queue.

As shown in FIG. 3, a resource manager 30 receives job requests from a print job scheduler 31 and a copy job scheduler 32, and controls the parallel processing of "print image data" and "copy image data". In addition, the resource manager 30 changes the priority order of a "print job" and a "copy job" according to an instruction from the UI 21.

The copy job scheduler 32 receives the status of the preceding copy job from the resource manager 30. Upon completion of the job, the copy job scheduler 32 requests the resource manager 30 to execute the next job connected to a copy job node queue 35. In the case where the job has been suspended, the copy job scheduler 32 waits for elimination of a factor which has suspended the job, and provides a job continuation request to the resource manager 30 after the elimination of the factor.

A UI input task 34 receives a copy job request from the UI 21, and connects job information to the copy job node queue 35.

The print Job scheduler 31 receives the status of the preceding print job from the resource manager 30. When the job has been ended, the print job scheduler 31 requests the resource manager 30 to execute the next job connected to a print job node queue 36. In the case where the job has been suspended, the print job scheduler 31 waits for elimination of a factor which has suspended the job, and returns the job to the print job node queue 36 after the elimination of the factor.

An IOCP input task 33 receives a print job request from the IOCP 11, and connects job information to the print job node queue 36.

The job node queue, as shown in FIG. 4, holds the pointers of the first and last job information connected to the queue list.

The copy job and the print job are received, for instance, in the following manner: When a copy job is being processed, the next copy job is not received, but a print job is received. On the other hand, when data of a print job is being written in the disk 7, a copy job is received, but a print job is not. When a print job is being output, a copy job is received until the operation of writing its data in the disk 7, and the next print job is also received. A print job is output after being stored in the disk 7 to the last page, and a copy job is received in preference over another print job while the print job is being stored in the disk 7. Thus, a user will not be kept waiting so long, whenever he wants to have an original copied.

As is apparent from the above description, normally the resource manager 30 gives preference to the copy job over the print job. Therefore, if a copy job comes in when a print job is being processed, the print job is suspended to process the copy job instead. For instance, when it is determined from the operation of the copy start key that a copying interrupt has occurred, the current print job is suspended and instead the copying operation is carried out. When the copying operation is ended, the print job is resumed immediately without cycle down. In addition to giving priority to a copy job in the above manner, the priority order of jobs may be changed in response to an instruction from the UI 21 so as to finish the job being processed. In addition, the resource manager 30 may work such that it detects a plurality of jobs in advance and allows small jobs to be processed in preference to the others, or causes a job coming later to be processed earlier than a job coming earlier. The resource manager may also give a copy job the highest priority due to some specific reason, even when it is set to process jobs based on their size or time of occurrence.

For instance in the case where a job is suspended because no recording sheet remains in the image output unit 20, another job for which the unit 20 has recording sheets (of another size) may be processed instead.

In the case of the print job the number of sheets to be output is calculated, whereas in the case of the copy job the number of sheets set by the UI 21 is detected, so that small jobs can be handled in preference to the others.

As is apparent from the above description, in the invention, the order of preference of jobs can be changed, whereby the user's waiting time can be reduced. Furthermore, priority is given to a copy job, and the job interrupting function is effected in response to, e.g., the operation of the copy start key, which also serves to reduce the user's waiting time. When a job coming earlier is suspended, a job coming later is instead processed. Therefore, even if an operator is away from the image processing system, jobs are successively processed, which contributes to improvement of the productivity. Moreover, even if jobs are input in a temporally serial manner, small jobs are processed in preference to the others, which contributes to the effective use of the image processing system.

The foregoing description of a preferred embodiment of the invention has been presented for purposes of illustration and description. It is not intended to be exhaustive or to limit the invention to the precise from disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing apparatus having means for receiving print image data of a print job from an external apparatus, means for reading an original to produce copy image data of a copy job, means for storing the print image data from the receiving means and the copy image data from the reading means, and means for outputting the print or copy image data provided from the storing means as a hard copy, said apparatus comprising:
   means for dividing the print image data of a print job received by the receiving means into a predetermined number of parts prior to processing the print image data;
   process control means for causing the print job to be processed in a time divisional manner on a part basis according to the predetermined number of parts divided by the dividing means, and the copy job to be processed on a job basis, in execution of processes including original reading by the reading means, storing of the print image data and the copy image data by the storing means, and providing of the print or copy image data from the storing means to the output means, such that the processing of the predetermined number of parts of the print image data is interleaved with the processing of copy image data in a predetermined sequence; and
   priority control means for causing the copy job to be processed earlier when the print and copy jobs are being processed concurrently.

2. The apparatus according to claim 1, wherein the priority control means causes a succeeding job to be processed earlier when a preceding job has been suspended.

3. An image processing apparatus having means for receiving print image data of a print job from an external apparatus, means for reading an original to produce copy image data of a copy job, means for storing the print image data from the receiving means and the copy image data from the reading means, and means for outputting the print or copy image data provided from the storing means as a hard copy, said apparatus comprising:
   means for dividing the print image data of a print job received by the receiving means into a predetermined number of parts prior to processing the print image data;
   process control means for causing the print job to be processed in a time divisional manner on a part basis according to the predetermined number of parts divided by the dividing means, and the copy job to be processed on a job basis, in execution of processes including original reading by the reading means, storing of the print image data and the copy image data by the storing means, and providing of the print or copy image data from the storing means to the output means, such that the processing of the predetermined number of parts of the print image data is interleaved with the processing of copy image data in a predetermined sequence;
   means for setting a priority order of a plurality of the print and copy jobs; and
   priority control means for causing the copy job to be processed earlier when the print and copy jobs are being processed concurrently, and causing the print or copy job to be processed according to the priority order when they are not being processed concurrently.

4. The apparatus according to claim 3, wherein the priority control means causes a succeeding job to be processed earlier when a preceding job has been suspended.

5. An image processing apparatus having means for receiving print image data of a print job from an external apparatus, means for reading an original by reciprocating scan to produce copy image data of a copy job, means for storing the print image data from the receiving means and the copy image data from the reading means, and means for outputting the print or copy image data provided from the storing means as a hard copy, said apparatus comprising:

means for dividing the print image data of a print received by the receiving means into a predetermined number of parts prior to processing the print image data so that each of the parts can be stored in the storing means within a non-reading scan period of the reciprocating scan of the reading means;

process control means for causing the print job to be processed in a time divisional manner on a part basis according to the predetermined number of parts divided by the dividing means, and the copy job to be processed on a job basis, in execution of processes including original reading by the reading means, storing of the print image data and the copy image data by the storing means, and providing of the print or copy image data from the storing means to the output means, such that the processing of the predetermined number of parts of the print image data is interleaved with the processing of copy image data in a predetermined sequence; and priority control means for causing the copy job to be processed earlier when the print and copy jobs are being processed concurrently.

6. An image processing apparatus having means for receiving print image data of a print job from an external apparatus, means for reading an original by reciprocating scan to produce copy image data of a copy job, means for storing the print image data from the receiving means and the copy image data from the reading means, and means for outputting the print or copy image data provided from the storing means as a hard copy, said apparatus comprising:

means for dividing the print image data of a print job received by the receiving means into a predetermined number of parts prior to processing the print image data so that each of the parts can be stored in the storing means in a return period of the reciprocating scan of the reading means;

process control means for causing the print job to be processed in a time divisional manner on a part basis according to the predetermined number of parts divided by the dividing means, and the copy job to be processed on a job basis, in execution of processes including original reading by the reading means, storing of the print image data and the copy image data by the storing means, and providing of the print or copy image data from the storing means to the output means, such that the processing of the predetermined number of parts of the print image data is interleaved with the processing of copy image data in a predetermined sequence;

means for setting a priority order to a plurality of the print and copy jobs; and priority control means for causing the copy job to be processed earlier when the print and copy jobs are being processed concurrently, and causing the print or copy job to be processed according to the priority order when they are not being processed concurrently.

7. An image processing apparatus comprising:

means for receiving print image data of a print job from an external apparatus;

means for reading an original to produce copy image data of a copy job;

means for storing the print image data from the receiving means and the copy image data from the reading means;

means for outputting the print or copy image data provided from the storing means as a hard copy;

means for setting a priority order to a plurality of the print and copy jobs;

process control means for controlling, in a time divisional and parallel manner, processes including original reading by the reading means, storing of the print image data and the copy image data by the storing means, and providing of the print or copy image data from the storing means to the output means; and priority control means for causing the plurality of the print and copy jobs to be processed according to the priority order;

wherein the priority control means causes the copy image data produced by the reading means to be processed with the highest priority regardless of the priority set by the setting means.

* * * * *

UNITED STATES PATENT AND TRADEMARK OFFICE
CERTIFICATE OF CORRECTION

PATENT NO. : 5,377,016
DATED : December 27, 1994
INVENTOR(S) : Hideaki KASHIWAGI et al It is certified that error appears in the above-indentified patent and that said Letters Patent is hereby corrected as shown below:

Claim 5, Column 9, Line 14, after "print" (second occurrence) insert --job--.

Signed and Sealed this

Sixteenth Day of May, 1995

Attest:

BRUCE LEHMAN

*Attesting Officer*    *Commissioner of Patents and Trademarks*